No Printed Specification Available
8992X
R. Dingee,
Cartridge Box.
Patented Aug. 15, 1835
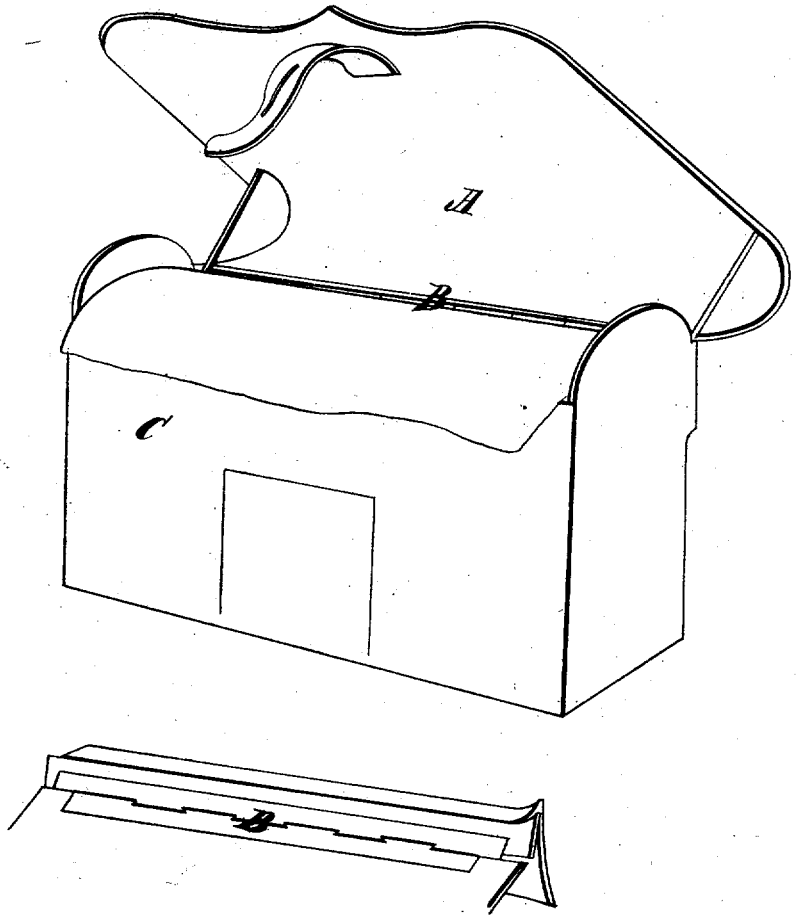
N. PETERS, PHOTO-LITHOGRAPHER, WASHINGTON, D. C.

Aug. 15. 1835

8992X

Robert Dingee of the City, County, & State of N. York,

Letters Patent.

The schedule referred to in these Letters Patent and making part of the same containing a description in the words of the said Robert Dingee himself of his improvement in the Cartouch Box. —

Be it known that I Robert Dingee of the City and County of New York, have made an improvement in the Cartouch Box, which is described as follows.

The body and flap of this Cartouch Box, are in form similar to those now in use, my improvement consists in using a double metallic hinge, connecting the flap with the body, This hinge is constructed of brass or any other suitable metal, it is made the whole length of the box, and has a number of joints connected by a wire passing through them. To admit of the hinge, the back part of the flap is split, the grain part being made very thin, this hinge is, united to the back part. by rivets upon both sides of the leather. The split leather of the flap covers both sides of the hinge, and is sewed down on the body; the seam is covered by the back strap. In the usual mode of making the Cartouch Box; the body and flap are one piece of leather; and by frequent use and exposure to the weather is liable to become very hard, difficult to be opened, and easily broken.

What I claim as my improvement, and desire to be secured by Letters Patent is the use of a metallic hinge, as before described, making the flap to open more easily & rendering the cartouch box more durable,

Witnesses
Clement T. Coote
S. A. Elliot

Robert Dingee

309 W. (Patented 15 Augt 1835)

Ex'd
Chgd (Drawing)